United States Patent
Jordan et al.

(10) Patent No.: US 7,366,725 B2
(45) Date of Patent: Apr. 29, 2008

(54) METHOD AND APPARATUS FOR DATA VALIDATION IN MULTIDIMENSIONAL DATABASE

(75) Inventors: Philip Martin Jordan, Auckland (NZ); Keith Steffen Ng, Auckland (NZ); Michael John Sanders, Auckland (NZ); Jerry Stewart, Auckland (NZ)

(73) Assignee: Descisys Limited, Auckland (NZ)

( * ) Notice: Subject to any disclaimer, the term of this patent is extended or adjusted under 35 U.S.C. 154(b) by 494 days.

(21) Appl. No.: 10/915,536

(22) Filed: Aug. 11, 2004

(65) Prior Publication Data

US 2005/0038799 A1 Feb. 17, 2005

Related U.S. Application Data

(60) Provisional application No. 60/493,783, filed on Aug. 11, 2003.

(51) Int. Cl.
*G06F 7/00* (2006.01)
(52) U.S. Cl. .................... 707/100; 707/2; 707/104.1
(58) Field of Classification Search .......... 707/2, 707/100, 104.1
See application file for complete search history.

(56) References Cited

U.S. PATENT DOCUMENTS

| | | | | |
|---|---|---|---|---|
| 5,359,724 | A | 10/1994 | Earle | 395/425 |
| 6,122,636 | A | 9/2000 | Malloy et al. | 707/102 |
| 6,289,352 | B1 * | 9/2001 | Proctor | 707/102 |
| 6,317,750 | B1 | 11/2001 | Tortolani et al. | 707/103 |
| 6,381,605 | B1 | 4/2002 | Kothuri et al. | 707/100 |
| 6,397,195 | B1 | 5/2002 | Pinard et al. | 705/30 |
| 6,405,208 | B1 | 6/2002 | Raghavan et al. | 707/102 |

(Continued)

FOREIGN PATENT DOCUMENTS

WO    WO 99/38094    7/1999

(Continued)

OTHER PUBLICATIONS

Lehner et al., CROSS-DB: A Feature-Extended Multidimensional Data Model For Statistical And Scientific Databases, Nov. 1996, ACM Press, pp. 253-260.*

(Continued)

*Primary Examiner*—Khanh B. Pham
*Assistant Examiner*—Jessica N Le
(74) *Attorney, Agent, or Firm*—Pillsbury Winthrop Shaw Pittman, LLP

(57) ABSTRACT

A method of managing cells formed from a tuple of members in a multidimensional database include treating at least one dimension in the database as a plurality of hierarchically structured members divided into at least two levels, thereby defining a validation curve as the location of an intersection of the levels. What level the cells in the database are located is evaluated. Cells contained in a lower level are managed by automatically indicating them as one of valid and invalid at data load time, and cells contained in an upper level are managed by indicating them as one of valid and invalid according to a method involving at least one of less reading from and writing to the database at data load time than if all the cells in the upper level were indicated as one of valid and invalid at data load time. A computerized database management system uses a communication interface to practice the method.

22 Claims, 4 Drawing Sheets

U.S. PATENT DOCUMENTS

| | | | |
|---|---|---|---|
| 6,574,619 B1 | 6/2003 | Reddy et al. | 707/2 |
| 6,601,062 B1 | 7/2003 | Deshpande et al. | 707/3 |
| 6,766,325 B1 * | 7/2004 | Pasumansky et al. | 707/101 |
| 6,768,986 B2 * | 7/2004 | Cras et al. | 707/2 |
| 2003/0023608 A1 * | 1/2003 | Egilsson et al. | 707/100 |
| 2003/0088548 A1 | 5/2003 | Kumar et al. | 707/3 |
| 2005/0283488 A1 * | 12/2005 | Colossi et al. | 707/100 |

FOREIGN PATENT DOCUMENTS

| | | |
|---|---|---|
| WO | WO 01/93111 A2 | 12/2001 |

OTHER PUBLICATIONS

Serrano et al., Experimental Validation of Multidimensional Data Models Metrics, 2002, IEEE, www.csdl.computer.org, pp. 1-7.*

Codd et al., "Providing OLAP to User-Analysts: An IT Mandate,", E.F. Codd Associates, 1993, pp. 1-20.

Pedersen et al, "Multidimensional Database Technology," IEEE, Dec. 2001, pp. 40-46.

Ramsak et al., "Interactive ROLAP on Large Datasets: A Case Study with UB-Trees," IEEE, 2001, pp. 1-10.

* cited by examiner

METHOD AND APPARATUS FOR DATA VALIDATION IN MULTIDIMENSIONAL DATABASE

CROSS REFERENCE TO RELATED APPLICATIONS

This application claims priority from U.S. Provisional Patent Application No. 60/493,783, filed Aug. 11, 2003 and is related to U.S. Provisional Patent Application No. 60/493,812 filed Aug. 11, 2003, and co-pending U.S. application Ser. No. 10/915,570 entitled "Method and Apparatus for Accessing Multidimensional Data," filed Aug. 11, 2004. The contents of each f the above-identified applications are incorporated herein by reference.

TECHNICAL FIELD

The present invention relates to the management of information in multidimensional databases and more particularly to methods of identifying the validity of data in multidimensional databases.

BACKGROUND

The increase in data storage and retrievable capabilities, together with advances in online analytical processing (OLAP) has resulted in unprecedented access to information. Typically, OLAP server products are either multidimensional OLAP (MOLAP) or relational OLAP (ROLAP). Both of these structures can store multidimensional information and have their respective and well known advantages and disadvantages.

In any database containing multidimensional data, ensuring that the data accessed is valid is a resource taxing activity. Typically, the database management system (DBMS) may check the validity of data when it is requested or alternatively may indicate the validity of data in advance, for example through the use of a flag.

Data in a database can be stored with a timestamp, indicating the last time when that piece of data was last written to. Data becomes invalid when any data that it is dependent on (its source data) is updated. Therefore, every time data is queried, either in itself or for use as part of a larger calculation, the DBMS may check the timestamp of all the source data and recalculate the data if necessary. A disadvantage of this method is that the number of database accesses is high, increasing the query or calculation time. An advantage of this method is that if data does not need to be recalculated, the calculation time is minimised. In today's environment when processing speeds have far outmatched IO speeds, this method of data validation may be inefficient, particularly if the source data regularly changes. Also, there is a minor increase in the database storage requirement due to having to store timestamps with the data.

Alternatively, whenever source data is updated, all data that is dependant on that source data may be either deleted or flagged as invalid, forcing recalculation of the dependent data if it is queried or used in a larger calculation. A disadvantage of this method is that during data load, large quantities of data must be invalidated, degrading data load performance. However, calculation and query performance is maximised, due to avoiding having to check all the source data of the calculated data prior to reading the calculated data.

Therefore, the approach selected for data validation depends on the nature of the data in the database. For constantly changing databases where calculation performance is not important, invalidation at query/calculation time may be preferred. If the time taken to load data is not important, invalidation at data load time may be preferred. This creates a problem for databases that may not fit into either of these generalisations, with the presently available options for cell validation having high associated efficiency degradation.

It is an object of the present invention to overcome or alleviate problems in management of multidimensional databases at present, or at least to provide the public with a useful alternative.

Further objects of the present invention may become apparent from the following description, given by way of example only.

Definitions

Calculated Cell: A cell including at least one calculated member.

Calculated Member: A member whose value is dependent on one or more other members and/or a mathematical formula.

Cell: A location in a multidimensional database. A cell is a tuple of members.

Dimension: A set of hierarchically related members.

Input-level cell: A cell whose location contains only members that are not dependent on other members.

Member: A unique position on a dimension that includes in itself or points to data.

OLAP: On-Line Analytical Processing. A category of applications and technologies that allow the collection, storage, manipulation and investigation of multidimensional data.

OLAP Server: An application that provides OLAP functionality over a multidimensional database.

Outline: The set of all dimensions in a multidimensional database.

Source cell: A cell including at least one source member.

Source member: A member on which another member (a calculated member) is dependant.

Throughout this specification, data in the multidimensional database has been referred to by reference to members and cells. However, this terminology is not intended to limit the scope of the invention to any particular data format in a multidimensional database.

Unless the context clearly requires otherwise, throughout the description and the claims, the words "include", "including", and the like, are to be construed in an inclusive sense as opposed to an exclusive or exhaustive sense, that is to say, in the sense of "including, but not limited to".

SUMMARY OF THE INVENTION

According to one aspect of the present invention there is provided a method of managing cells formed from a tuple of members in a multidimensional database, the method comprising treating at least one dimension in the database as a plurality of hierarchically structured members divided into at least two levels, thereby defining a validation curve as the location of an intersection of said levels, evaluating in what level cells in the database are located and managing cells contained in a lower level by automatically indicating them as one of valid and invalid at data load time and managing cells contained in an upper level by indicating them as one of valid and invalid according to a method involving at least one of less reading from and writing to the database at data load time than if all the cells in the upper level were indicated as one of valid and invalid at data load time.

Preferably, the location of at least one validation curve for at least one dimension varies across the dimension.

Preferably, the multidimensional database comprises at least two dimensions in the database treated as a plurality of hierarchically structured members having at least two levels and the method further comprises locating the validation curve within each dimension separately.

Preferably, the method comprises allowing for the adjustment of the location of the validation curve of at least one dimension. The method may further comprise automatically adjusting the operation of the multidimensional database by adjusting the location of the validation curve according to historical data.

Preferably, each cell comprises at least two members and wherein the method further comprises allowing for the adjustment of the method by which cells are determined to be above or below the validation curve. The method may further comprise automatically adjusting the method by which cells are determined to be above or below the validation curve according to historical data. The historical data may indicate the location of cells in the database that have been queried, used as part of a larger calculation and/or updated and the frequency that cells in the database have been queried, used as part of a larger calculation and/or updated.

Preferably, the method further comprises treating the at least one dimension in the database as a plurality of hierarchically structured members divided into two levels, consisting of one upper level and one lower level.

Preferably, cells in said upper level are managed according to at least one of the options:

the cells are permanently indicated as invalid;

the cells are stored with a timestamp indicating the time that the cell was last updated, wherein a calculated cell is evaluated as being one of valid and invalid by comparing the timestamp of the calculated cell with the timestamp of its source cells located above the validation curve and by determining the validity of its source cells located below the validation curve; and only cells that may be queried are stored in the multidimensional database and the cells are indicated as one of valid and invalid at data load time.

Preferably, all cells in said upper level for all dimensions are managed according to one of the options a)-c).

Preferably, no cells above the validation line are stored in the multidimensional database.

Preferably, option b) is used and if the calculated cell is evaluated to be invalid the method comprises recalculating the calculated cell by evaluating the validity of its source cells, working down the hierarchical structure until a base of valid cells is reached and then working up the hierarchical structure recalculating cells until said calculated cell is recalculated.

Preferably, the multidimensional database comprises an index defining its cells, the index including a pointer to the relevant data forming the cells, wherein the validity of a cell is indicated by associating validity information with the index.

Preferably, the cells are formed from at least two members from different dimensions.

According to another aspect of the present invention, there is provided a computerised database management system for a multidimensional database comprising cells formed from a tuple of members, the computerised database management system comprising a communication interface for reading from and writing to a database, computer processing means for controlling the operations of the database management system and computer memory containing an instruction set readable by said computer processing means, wherein when the instruction set is executed by the computer processing means the computerised database management system uses said communication interface to:

maintain at least one dimension in the database as a plurality of hierarchically structured members divided into at least two levels, thereby defining a validation curve as the location of an intersection of said levels; and evaluate in what level cells in the database are located and managing cells contained in a lower level by automatically indicating them as one of valid and invalid at data load time and managing cells contained in an upper level by indicating them as one of valid and invalid according to a method involving at least one of less reading from and writing to the database at data load time than if all the cells in the upper level were indicated as one of valid and invalid at data load time.

Preferably, the computerised database management system includes a pluggable component operable to set the location of the validation curve. Preferably, the pluggable component is operable to analyse historical data on the use of the multidimensional database and automatically adjust the location of the validation curve dependent on the historical data.

Preferably, the computerised database management system includes a pluggable component operable to set a method by which cells are determined to be above or below the validation curve, by setting the number of members that need to be above or below the validation curve in order for the cell to be above or below the validation curve. Preferably, the pluggable component is operable to analyse historical data on the use of the multidimensional database and automatically adjust the location of the validation curve dependent on the historical data.

According to another aspect of the present invention, there is provided a method of managing cells formed from a tuple of members in a multidimensional database, the method comprising maintaining an index to the cells, the index defining a hierarchical structure containing pointers to the members that make up each cell, allocating each cell to one of at least two levels in the hierarchical structure and associating with the index a cell validity indicator for each cell, wherein the cell validity indicator is updated upon the occurrence an event, wherein the class of event that causes the cell validity indicator to be updated is dictated by the level in which the cell is allocated.

Preferably, the method further comprises automatically updating the cell validity indicator for cells allocated to the lowermost level when new data is loaded into the database.

Preferably, cells in an upper level of said at least two levels are permanently indicated as invalid.

Preferably, cells in an upper level of said at least two levels are stored with a timestamp indicating the time that the cell was last updated and wherein a calculated cell is evaluated as being one of valid and invalid by comparing the timestamp of the calculated cell with the timestamp of its source cells in the upper level and by determining the validity of its source cells that are located below the validation curve.

Preferably, only cells that may be queried are stored in the multidimensional database and the cells are indicated as one of valid and invalid at data load time.

Further aspects of the present invention may become apparent from the following description, given by way of

DETAILED DESCRIPTION OF THE DRAWINGS

The present invention relates to a method of managing data in a multidimensional database and in particular to a method of ensuring that queried cells or cells used as part of a larger calculation are valid before being returned or used in the calculation. The method includes separating the upper and lower hierarchical levels of the database and invalidating cells in the lower levels at load time. Cells in the higher levels are invalidated using a different method that may in at least some circumstances decrease or eliminate the need to read from and write to the database during data load time.

Figure 1:
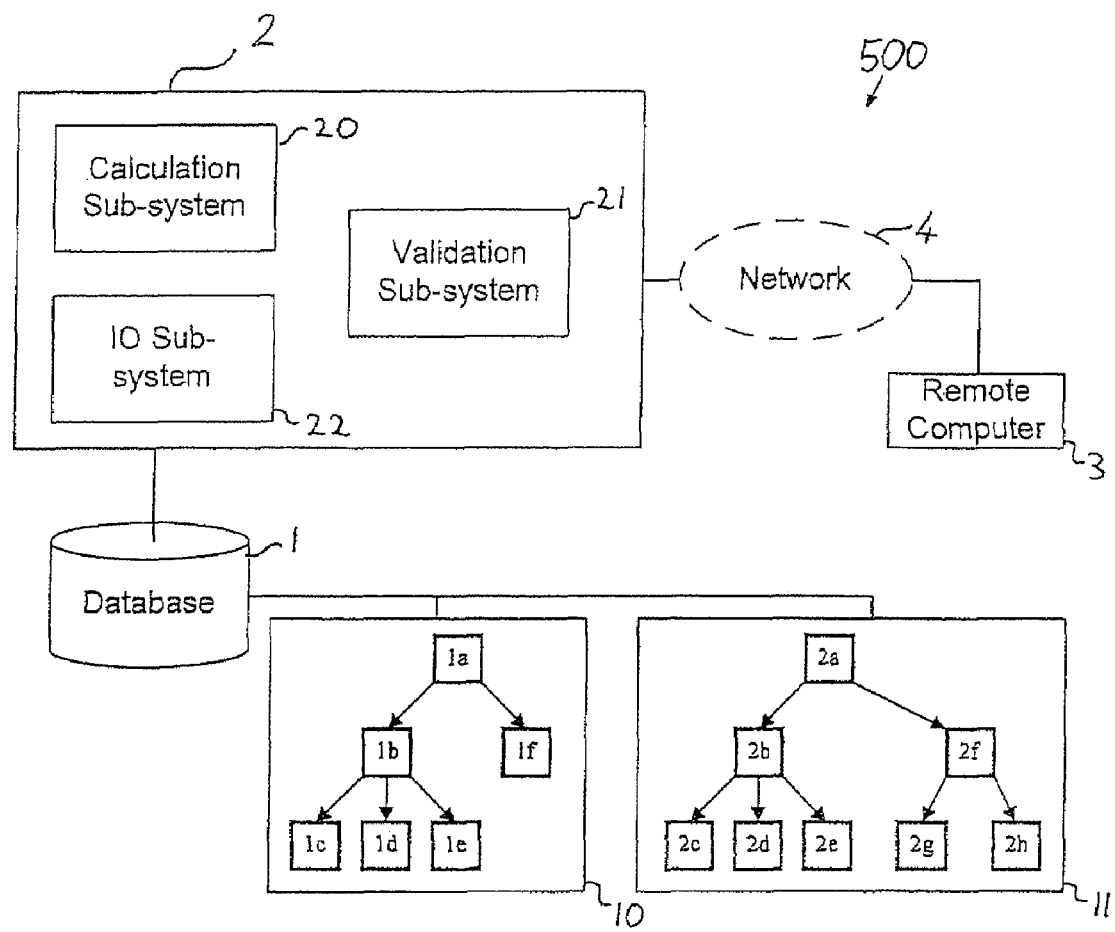
FIG. 1: Shows a block diagram of a computer system for performing the validation method of the present invention.

Referring first to FIG. 1, a diagrammatic representation of a computer system in which the present invention has been implemented is shown and generally referenced by arrow 500. A database 1 is provided, containing a multidimensional data space that may be arranged in a hierarchical manner. Two branches from the hierarchical structure of the database 1 are referenced 10 and 11. Each branch 10, 11 is made up of a plurality of members referenced 1a-1e and 2a-2h respectively. The unit of information in the database that is queried is a cell, defined by a tuple of members (M1, M2, M3 . . . MN), where M1 to MN represents one member from each of the N dimensions in the database 1. A cell is either populated with a numeric value, or is empty. An empty cell has an implicit value of null. A cell is typically formed by a member from every dimension in the database.

The database 1 may be a single multidimensional database space or alternatively may be made up of a plurality of multidimensional database spaces or treated as one or a plurality of multidimensional database spaces for the purposes of applying the present invention thereto. Where there are a plurality of multidimensional database spaces, the invention may be provided to one of the spaces, all of the spaces or a selected number of database spaces.

In communication with the database 1 is a database management system (DBMS). The DBMS 2 includes a calculation sub-system 20, validation sub-system 21 and input/output (IO) sub-system 22. The calculation sub-system 20 performs calculations on data retrieved from the database 1 or otherwise input to the DBMS 2, the validation sub-system 21 controls the validation and invalidation of data in the database 1 and the IO sub-system 22 controls the reading to and writing from the database 1. The DBMS 2 may be an OLAP server.

The database 1 may be queried using a remote computer 3 running a suitable application, which may communicate with the DBMS 2 through a local or wide area network 4. Suitable computer processors, communication interfaces and data storage mechanisms for the computer system 500 shown in FIG. 1 are well known in the relevant arts and therefore will not be described further herein.

A user of the system will input queries for the database and receive the results back from the DBMS 2 by operating the remote computer 3, using an input device such as a keyboard and point and click device. The DBMS 2 then retrieves the relevant information from the database 1, performs any required calculations and returns the result to the remote computer 3 for display to the user. Although in the description herein, it is assumed that the remote computer 3 a "dumb" terminal in relation to managing the database 1, those skilled in the relevant arts will appreciate that the remote computer 3 may perform some of the functions of DBMS 2 described herein, with suitable mechanisms in place to lock data while any particular computer is performing an operation on that data. Also, the processing capabilities of the DBMS 2 may be distributed amongst a plurality of computer processors.

Figure 2:
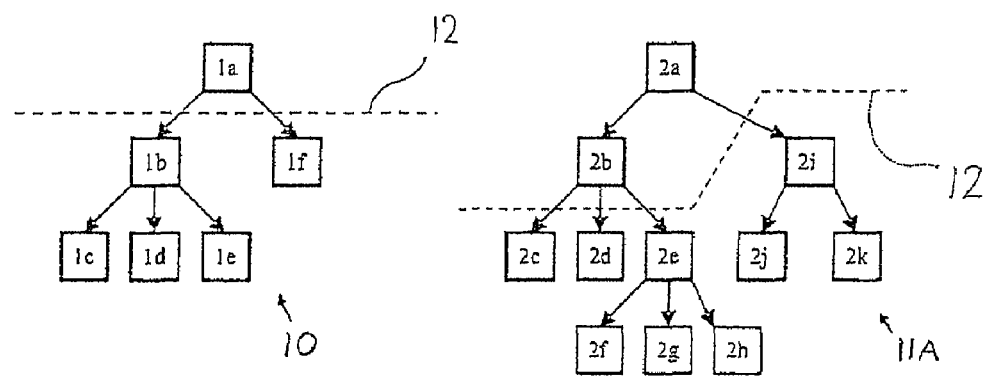
FIG. 2: Shows a diagrammatic representation of a multidimensional database structure and a possible location of a validation curve within the structure.

FIG. 2 shows branch 10 and a modified branch 11, referenced 11a, from different dimensions in the database 1. The branches 10, 11 and 11A described herein represent dimensions of a database and are a simplified example, given for the purposes of illustration only. Practical systems will have many dimensions and more complex branch structures. Any combination of members, one from each dimension defines a cell, which may be requested in a query or for a calculation. FIG. 2 shows a hierarchical structure for the data. Alternatively, the actual data in the database 1 may be separate from the data structure, with the data structure indicated by an index. In some embodiments the structure of the data may be managed separately from the hierarchical structure of the index. Methods for managing data in this manner are described in the Applicant's co-pending application No. 60/493,812 entitled "Method And Apparatus For Accessing Multi Dimensional Data" and having the same filing date as this application. The contents of this co-pending application are hereby incorporated herein in their entirety.

According to the present invention, cells in the database 1 are treated differently according to their level in the index hierarchy. Calculated cells in a lower consolidation level of the database 1 that have a source cell that has changed are indicated as invalid at data load time. Cells in a higher consolidation level in the database 1 are updated using a different strategy that may at least in some circumstances reduce the degradation of in data load performance over indicating these cells as invalid at data load time. In FIG. 2, the separation of the database 1 into levels is shown diagrammatically by a validation curve 12, which is inherently defined by the intersection of the levels. In this example, two levels are defined, treating members 1a, 2a and 2b as being in the upper consolidation levels of the database 1 and the remaining members in the lower consolidation levels of the database 1.

Whether a cell is above or below the validation curve 12 determines when and how its validity is verified. As mentioned herein above, a cell may be defined by a tuple of members in the database 1 and a single cell may include individual members above and below the validation curve 12. There are therefore various strategies for determining whether a particular cell is above or below the validation curve 12. By choosing an appropriate strategy, tuning of the database 1 to a particular operating environment may be achieved. The choice, in conjunction with an adjustable validation curve (if provided) affects the total number of cells above and below the validation curve. The selection of a strategy may form part of an autonomic self-tuning system, or be selected by a database administrator, as a result of performing statistical analysis of the database performance.

Four possible examples of strategies for determining the location of a cell in relation to the validation curve are described below. Those skilled in the relevant arts will appreciate that alternatives to the four examples provided herein may be used.

Strategy A: a cell is below the validation curve only if every member of the tuple forming the cell is below the validation curve. This may be the default strategy, anticipated to be sufficient for the majority of data/query requirements.

Strategy B: a cell is below the validation curve if at least one member of the tuple forming the cell is below the validation curve. When a high percentage (e.g. 90%) of the calculated cells are stored, this method may be used to limit the total number of cells stored, for example to save some disk space. This may also be able to be achieved using strategy A by setting all the dimension validation curves almost to the top. However, in the case where there is uncertainty as to what the queries are, use of strategy A may unintentionally result in everything being stored.

Strategy C: a cell is below the validation curve if a member from a particular dimension or particular group of dimensions is below the validation curve, regardless of the other dimensions. Since most of the queries may be based on a partial cell of one dimension or a few dimensions (e.g. measures), it may make more sense to store the cells based on this dimension. It is anticipated that requiring at least two dimensions to be below the validation curve may be advantageous. If this strategy is used and the same dimension or group of dimensions is always used to evaluate the position of the cell relative to the validation curve 12, then the validation curve 12 need only be defined for that dimension or group of dimensions.

Strategy D: a cell is below the validation curve if at least half (or another specified proportion) the members of the tuple are below the validation curve. This strategy may be applicable if the cells queried are fairly random and a similar query response time for each different query is required. This strategy may help average out the query response times.

The validation curve 12 may be defined for each dimension in the database 1, although it is not necessary that every dimension is split into upper and lower levels and some dimensions may have all their non-input level members treated as if they were above the validation curve or below the validation curve. Also, the level of the validation curve 12 may vary across a single dimension, as is shown for branch 11A.

As is typical of a multidimensional database, a user may request a combination of information from branches 10 and 11. For example if branches 10 and 11 contain time and sales information, a query may be of the form all sales over a given period of time from a number of sales outlets. This type of query defines a plurality of combinations of members from branches 10 and 11, usually an area in the multidimensional database.

The level of the validation curve 12 need not be constant. The location of the validation curve 12 could either be specified in advance, or adapted to the use of the database 1. Adaptation of the validation curve 12 may be achieved by analysing historic queries and database IO activities. For example, if the cells that are most often queried in the upper levels of a dimension hierarchy predominantly have, as input level cells, cells that are changed infrequently, or never, it will be advantageous to raise the validation curve for that dimension or part of that dimension. The validation curve 12 may be able to be adjusted for only a single dimension, a selection of dimensions, or for all dimensions, depending on requirements for tuning the database and any processing and/or communication constraints.

The algorithm that determines the position of the validation line 12 may be a pluggable JavaScript component, independent of the validation sub-system 21. Tuning the validation sub-system 21 for a specific operating environment may then be achieved by modifying this pluggable component.

The validation curve 12 may be adjusted automatically in response to requests for data and data load. To achieve this, whenever an operation is performed on the DBMS 2 certain statistics about that operation may be recorded. Such statistics may include frequency of operation and the level of requested data. Over time, a picture is built up of the typical usage of the DBMS 2. Fluctuations to the pattern are either averaged over time or filtered in order to ensure that unusual activity does not affect normal operation. For example if the data access is consistently high for a particular dimension, and data load frequency and quantity is low then the validation curve 12 for that dimension may be raised.

When the validation curve 12 moves up or down, the validation sub-system 21 is required to invalidate or delete the cells that were previously below the curve but are now above it. The reason being if the curve happened to move up again, these cells need to be invalid or missing (deleted). Moving the curve up requires no further action. The validation curve 12 is an indication for the system to decide what to store, not store or update as invalid. This also holds when the validation curve 12 moves, as the system will update the cells that were previously above the curve as invalid in one transaction.

In one embodiment of the present invention, the database 1 may have a separate index database storing and defining the hierarchical structure of the database 1 and containing pointers to the relevant indexed data. If this database structure is used, then the validity information may be associated with the entry in the index, rather than the actual data, allowing fast access to the validity information. Alternatively, the validity information may be associated with the actual data, in which case it is anticipated that increased IO activity and therefore increased time may be required to access this information.

The validity information may be in one of several forms, and may include a timestamp to allow comparison with the timestamp of its source cells, a flag indicating validity or otherwise of the cell, or an invalid cell may be changed to a null (which is inherently invalid unless it is an input level cell). The method used for showing invalidity may vary between different implementations of the present invention, according to the requirements for the database and according to whether the relevant cells are located above or below the validation curve.

Figure 3:
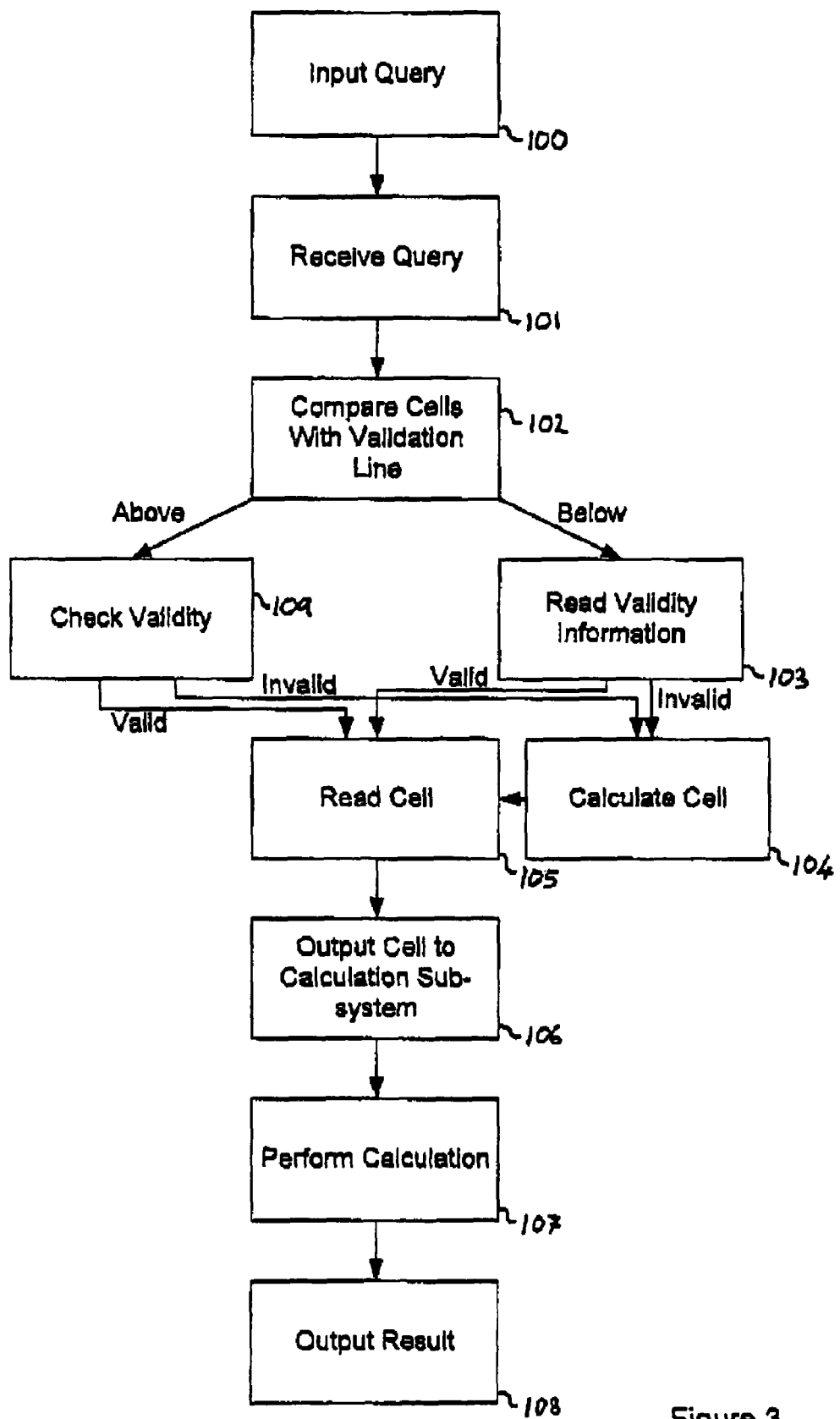
FIG. 3: Shows a flow diagram of the steps to perform a calculation using data members in a multidimensional database.

FIG. 3 shows a flow diagram of a process to query the database 1. The user operates the remote computer 3 to input a query in step 100. The query is transmitted to the DBMS 2, which receives the input query at step 101. The relevant cells required to answer the query are identified and in step 102 the validation system 21 compares the location of the requested cells in their dimension with the validation curve. For the cells below the validation curve, the validation sub-system 21 sends a request to the IO sub-system 22 to read the validity information for those cells. As the cells below the validation curve 12 are indicated as valid or invalid at data load time, then this information may be directly read in step 103.

If the validity information indicates that the cell is invalid, for example by an invalidity flag being active, or the cell being a null, the process proceeds to step 104 and the required cells are recalculated, after which they are read in step 105. If in step 103 the validity information indicated that the cell was valid, the process proceeds directly to step 105, with the relevant cell being read. In order to read a cell, the validation sub-system 21 may pass a request to the IO sub-system 22, which reads the relevant cells and returns their value. In step 106 the read cells are forwarded to the calculation sub-system where any calculation, for example addition, subtraction or multiplication or other combination of cell information is performed in step 107. The result of this is output to the remote computer 3 in step 108. If no calculation is required, steps 106 and 107 may be omitted.

If in step 102 cells were identified that are located above the validation curve 12, the validity of these cells would need to be checked in step 109. There are various options for performing this, two of which are shown in FIGS. 4A and 4B.

Figure 4:
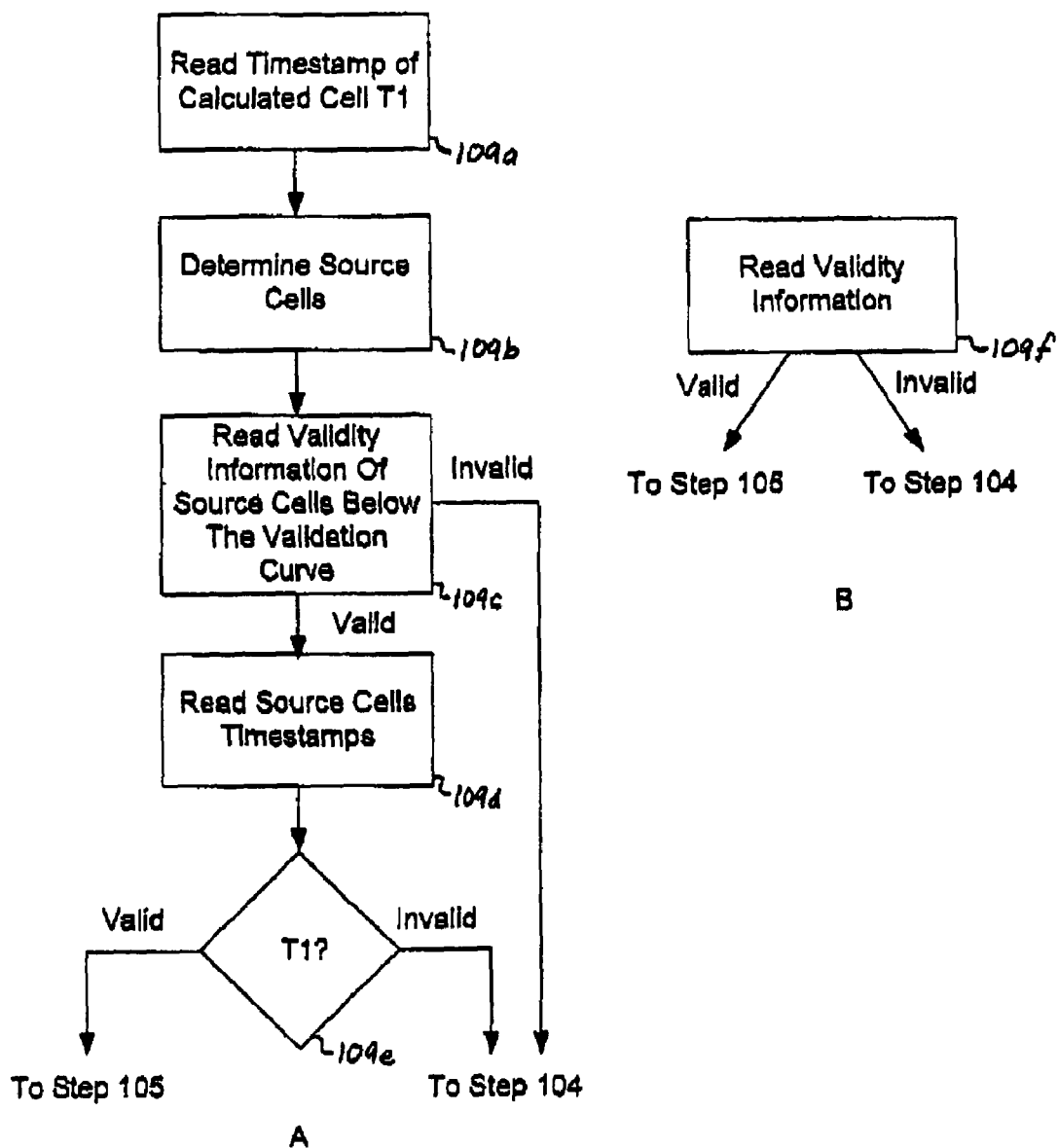
FIGS. 4A, B: Show two examples of possible steps for checking the validity of cells above the validation curve.

For the process shown in FIG. 4A, cells above the validation curve 12 are stored with a timestamp indicating the last time that they were written to. Therefore, step 109 first involves reading the timestamp of the calculated cells in step 109a. Next, in step 109b, all the source cells of the calculated cell (which may be calculated cells themselves) down to the validation curve 12 are identified. Also, the cells below the validation curve that the lowest level identified source cells above the validation curve directly depend on are identified. These cells will be below the validation curve 12 and therefore their validity is determined at data load time. In step 109d the validity information for the identified cells below the validation line is read. If any of these cells are indicated as invalid, the process proceeds to step 104. If these cells are all valid, the process proceeds to step 109d. In step 109d the timestamp of the identified cells above the validation curve 12 are read. In step 109e, the timestamp read in step 109a is compared to the timestamps read in step 109d. If the timestamps of any of the source cells are later than the calculated cell's timestamp, the cell is invalid. Only if all these source cells are indicated as valid is the calculated cell valid. If the cell is determined to be valid, the process proceeds to step 105 and if the cell is determined to be invalid, the process proceeds to step 104.

Referring now to FIG. 4B, instead of storing each cell above the validation curve with a timestamp, only selected cells above the validation curve may be stored, being cells which are directly queried. Any cells that are not directly queried, for example intermediate cells used as part of a calculation, but the value of which is otherwise not required are not stored. In this embodiment, the directly queried cells are invalidated at data load time, with the system using the method by which cells are aggregated into their parents and/or the formula map to determine the input-level cells that a queried cell depends on. This avoids having to work through and indicate as invalid all the intermediate cells, decreasing the time for data load. In this embodiment, the validity of the calculation cells above the validation curve is always known and step 109 is replaced by step 109f, which involves a simple reading of the validity information. The process then proceeds to step 105 if the validity information indicates the cell is valid, otherwise the process proceeds to step 104.

In a further alternative, cells above the validation curve may be permanently deemed to be invalid. In one embodiment that may be advantageous for some databases, cells above the validation curve may never be stored, in which case any queried cells above the validation curve need to be recalculated for every cell access. An advantage of this is that the system can immediately start acquiring source cells (below the line) rather than check the validity of intermediate cells; being pessimistic this system will perform best when data is loaded frequently. This embodiment minimises reading from the database at data load time as database access is zero. In this embodiment, step 109 from FIG. 3 would be omitted and if in step 102 it is determined that cells above the validation curve are required, the process will proceed directly to step 104. Data load performance for cells above the validation line may be maximised if all cells above the validation line are deemed to be invalid.

Those skilled in the relevant arts will appreciate that combinations of the above three methods may be used for managing cells above the validation curve. For example, either timestamp or a validity indicator may be associated with a cell, and the validation sub-system 21 may recognise whether the associated information has a validity indicator or timestamp associated with it and use the steps described in relation to FIGS. 4A or 4B depending on its determination of whether the information was validity information or time stamp information. If the cell was null, then the validity sub-process 21 would interpret this as invalid. In a further alternative, cells may be separated into types having a timestamp, validity indicator or always invalid and the database management system 2 may store certain classes of information in certain types of cells. Further alternative methods of managing cells above the validation curve may be used either alone or in combination with the methods described herein above to achieve an increased data load performance in comparison to updating the validity of all cells above the validation curve at data load time.

In a further alternative embodiment, each dimension may be treated as having three or more levels, each with their own strategy for management of the cell validity. In this embodiment, at least in one lower level, preferably in the lowest level, cells that have a source cell updated are invalidated at data load time, and the levels above use one of the three methods described herein above or another suitable method of management that reduces IO activity at data load time and/or during use of the database for query or calculation operations.

In order to recalculate a cell in step 104 or to read the timestamps step 107c, the cells that a calculation cell depends on must be determinable. The cell dependency may be determined by searching for all dependent calculated cells on a given input-level cell or by finding cells upon which a given calculated cell depends.

In order to search for all dependent calculated cells of an input-level cell, the outline of the dimension hierarchy may be used together with the formula map. For example, starting at an input-level cell, the immediately dependent cell(s) of that input-level cell include the parent of the input-level cell if the input-level cell aggregates to that parent and any other cell identified from the formula map that uses the input-level cell as a source cell. The process then repeats for each cell identified as dependent on an input-level cell and so on either up to the validation curve or up to the top level cells of the database hierarchy as required. When a cell needs to be recalculated, the above process may be used to identify the cells that each calculation cell is dependent on.

When only directly queried cells above the validation curve are stored, to determine whether a cell is valid, the process may search down the dimension hierarchy instead of up the dimension hierarchy. In this process, for a given calculation cell, the immediate members that it depends on are the children of that calculation cell if the children aggregate to that query cell, or if that query cell has a member formula, the source cells of that formula. The process is then repeated down the dimension hierarchy, down to either the validation curve or the input-level cells of the database hierarchy as required.

While searching down the database hierarchy in a dimension, there are multiple paths to the input-level cells that traverse different intermediate cells. Not every possible path needs to be searched if the calculation order through the multidimensional database is known. Using the same search path that the calculation sub-system 20 uses ensures that the validity of a cell is determined correctly. The operation of the calculation sub-system is described in more detail herein below.

As will be apparent to those skilled in the relevant arts, whenever an input-level cell is updated, causing its dependent cells to be invalidated, the invalidation process must occur within the same transaction that updated the input-level cell. Otherwise, there is a short period in which the database is in an inconsistent state, which may result in errors.

The calculation sub-system 20 is operable to return a value for any non-input level cells. When it receives a request to perform a calculation, it will first check for the existence of the necessary cells via the validation sub-system 21. If the cells are valid, they are returned. If one or more of the necessary cells are invalid, the calculation sub-system 21 will identify its source cells. The source cells may be determined either starting from the input-level cells and working upwards through the member hierarchy, or working from the cell requiring calculation down through the member hierarchy. Whichever method is used to identify the cell dependencies, the calculation sub-system 21 need only work down the member hierarchy from the necessary cells checking whether its source cells are valid until it has located a base of valid cells. The base of valid cells may, for example be a set of source cells below the validation curve 12 indicated as valid. If timestamps are associated with cells above the validation curve 12, then the calculation sub-system 21 may identify the highest level source cells for the calculation cell under consideration. If any of these are indicated as invalid, then they must be recalculated and all calculated cells depending on these cells must be recalculated, If all these cells are indicated as valid, the calculation sub-system 21 need only work down through the hierarchy until it finds a calculated cell that has a later timestamp than all its immediate children (i.e. the source cells one level lower in the hierarchy). This calculated cell that has a later timestamp than all its immediate children is necessarily valid.

The calculation sub-system 20 then works up the member hierarchy, recalculating the cells until the necessary cells have been calculated. Each calculated cell is passed to the validation sub-system 21, which decides whether to store the cell or not, depending on whether it is above or below the validation curve 12 and for those above the validation curve 12 the particular strategy used for that database or portion of the database.

Figure 5:
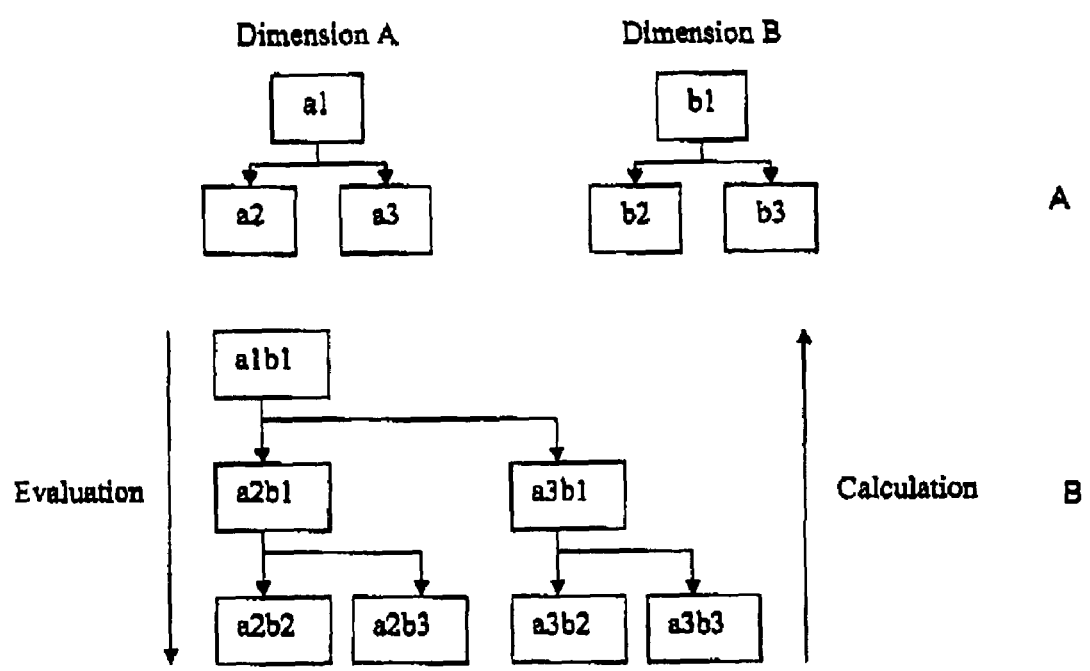
FIGS. 5A, B: Shows diagrammatically the evaluation of source cells and the calculation of a cell in a multidimensional database.

FIG. 5 shows a simple example of this process, using only two dimensions named dimension A and dimension B. If the sought cell is "a1,b1", the evaluation tree is that shown in FIG. 5b. The evaluation process works down the tree shown in FIG. 5b until a base of valid cells is identified, with input level cells always being valid even if they are null. When all dependent cells have been evaluated, the calculation process commences, working up the hierarchy.

The simple example shown in FIG. 5 assumes a formula for each non-input level member, of the simple sum of its child members. However, this default formula can be overwritten by changing the member's roll-up attributes or by a custom formula.

The roll-up attributes include the "roll-up order" and the "roll-up operator". The roll-up order is the order in which the child members of a parent member are evaluated. The child with the lowest order number will be evaluated first. In one embodiment, default the roll-up order may be defined by sibling order in the dimension tree. The "roll-up operator" is the operation by which child members are aggregated into their parent. The default roll up operator may be addition. Creating formulas for parent members may be avoided in some cases by changing the roll up attributes. Alternatively, a cell may be calculated depending on a formula, the formula being defined by the formula map.

In some cases, if multiplication or division is included in a cell formula, or if there are formulas using cross dimensional member positions, or other similar operations, there needs to be a mechanism to indicate to the calculation sub-system 20 the order to evaluate the dimensions, as a differing order will result in different values for a single cell. This mechanism is a requirement for a cells value to be deterministic and have no ambiguity.

In order to address this, each dimension is provided a unique calculation order number. By default, dimensions are given calculation order numbers corresponding to their order in the multidimensional outline. Dimension calculation order provides the default calculation order for all its dimension members. However, any specific member's calculation order can be overridden. The member calculation order is used to determine the order of member evaluation for a cell i.e. for any given cell, the member with the lowest calculation order will be evaluated first. Accordingly, member calculation order must be unique across the dimensions to guarantee only one possible evaluation order for any cell. However, a calculation order number may be reused within the same dimension.

The description herein above has assumed that operations performed on the data in the database 1 require cells having a member from every dimension (full cells), or at least that full cells are evaluated during operation of the DBMS 2. An exception to this is some of the strategies used for determining whether a cell is above or below the validation line, which use a partial cell definition for making this determination. Partial cell definitions comprising members from not all dimensions or only a few dimensions may also be used in some operations and calculations. If partial cell definitions are used, the members of the partial cell definition define whether their cell is above or below a validation curve. The DBMS 2 may still operate on the basis of entire cells and extract the partial cell definition for evaluation and use.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The invention claimed is:

1. A method of managing cells formed from a tuple of members in a multidimensional database, the method comprising:

treating at least one dimension in the database as a plurality of hierarchically structured members divided into at least two levels, thereby defining a validation curve as the location of an intersection of said levels;

evaluating in what level cells in the database are located;

managing cells contained in a lower level by automatically indicating them as one of valid or invalid at data load time; and managing cells contained in an upper level by indicating them as one of valid or invalid in a manner that involves less reading from and/or less writing to the database at data load time than if all the cells in the upper level were indicated as one of valid or invalid at data load time, wherein cells in said upper level are managed according to at least one of the options:

a) the cells are permanently indicated as invalid;

b) the cells are stored with a timestamp indicating the time that the cell was last updated, wherein a calculated cell is evaluated as being one of valid and invalid by comparing the timestamp of the calculated cell with the timestamp of its source ceils located above the validation curve and by determining the validity of its source cells located below the validation curve; and c) only cells that may be queried are stored in the multidimensional database and the cells are indicated as one of valid and invalid at data load time;

allowing for adjustment of the location of the validation curve of at least one dimension.

2. The method of claim 1, wherein the location of at least one validation curve for at least one dimension varies across the dimension.

3. The method of claim 1, wherein the multidimensional database comprises at least two dimensions in the database treated as a plurality of hierarchically structured members having at least two levels and the method comprises locating the validation curve within each dimension separately.

4. The method of claim 1, further comprising automatically adjusting the operation of the multidimensional database by adjusting the location of the validation curve according to historical data.

5. The method of claim 1, wherein each cell comprises at least two members and wherein the method further comprises allowing for the adjustment of the method by which cells are determined to be above or below the validation curve.

6. The method of claim 5, further comprising automatically adjusting the method by which cells are determined to be above or below the validation curve according to historical data.

7. The method of claim 6, wherein the historical data indicates the location of cells in the database that have been queried, used as part of a larger calculation and/or updated and the frequency that cells in the database have been queried, used as part of a larger calculation and/or updated.

8. The method of claim 1, further comprising treating the at least one dimension in the database as a plurality of hierarchically structured members divided into two levels, consisting of one upper level and one lower level.

9. The method of claim 1, wherein all cells in said upper level for all dimensions are managed according to one of the options a) -c).

10. The method of claim 1, wherein no cells above the validation line are stored in the multidimensional database.

11. The method of claim 1, wherein option b) is used and whether the calculated cell is evaluated to be invalid the method comprises recalculating the calculated cell by evaluating the validity of its source cells, working down the hierarchical structure until a base of valid cells is reached and then working up the hierarchical structure recalculating cells until said calculated cell is recalculated.

12. The method of claim 1, wherein the multidimensional database comprises an index defining its cells, the index including a pointer to the relevant data forming the cells, wherein the validity of a cell is indicated by associating validity information with the index.

13. The method of claim 12, wherein the cells are formed from at least two members from different dimensions.

14. A computerized database management system for a multidimensional database that comprises cells formed from a tuple of members, the computerized database management system comprising:

a communication interface configured to read from and write to a database;

computer processing means for controlling the operations of the database management system and computer memory containing an instruction set readable by said computer processing means, wherein when the instruction set is executed by the computer processing means, the computerized database management system employs said communication interface to:

a) maintain at least one dimension in the database as a plurality of hierarchically structured members divided into at least two levels, thereby defining a validation curve as the location of an intersection of said levels;

b) evaluate in what level cells in the database are located;

c) managing cells contained in a lower level by automatically indicating them as one of valid or invalid at data load time; and d) managing cells contained in an upper level by indicating them as one of valid or invalid in a manner that involves less reading from and/or less writing to the database at data load time than if all the cells in the upper level were indicated as one of valid or invalid at data load time, wherein cells in said upper level are managed according to at least one of the options:

i) the cells are permanently indicated as invalid;

ii) the cells are stored with a timestamp indicating the time that the cell was last updated, wherein a calculated cell is evaluated as being one of valid and invalid by comparing the timestamp of the calculated cell with the timestamp of its source ceils located above the validation curve and by determining the validity of its source cells located below the validation curve; and iii) only cells that may be queried are stored in the multidimensional database and the cells are indicated as one of valid and invalid at data load time;

e) allowing for adjustment of the location of the validation curve of at least one dimension.

15. The computerized database management system of claim 14 including a pluggable component sets the location of the validation curve.

16. The computerized database management system of claim 15, wherein said pluggable component analyzes historical data on the use of the multidimensional database and automatically adjust the location of the validation curve dependent on the historical data.

17. The computerized database management system of claim 14 including a pluggable component sets a method by which cells are determined to be above or below the validation curve, by setting the number of members that need to be above or below the validation curve in order for the cell to be above or below the validation curve.

18. The computerized database management system of claim 17, wherein said pluggable component analyzes historical data on the use of the multidimensional database and automatically adjust the location of the validation curve dependent on the historical data.

19. A method of managing cells formed from a tuple of members in a multidimensional database, the method comprising:
- maintaining an index to the cells, the index defining a hierarchical structure containing pointers to the members that make up each cell;
- allocating each cell to one of at least two levels in the hierarchical structure; and
- associating with the index a cell validity indicator for each cell,
- wherein the cell validity indicator is updated upon the occurrence of an event and a class of event that causes the cell validity indicator to be updated is dictated by the level in which the cell is allocated, and
- wherein the cells in an upper level of said at least two levels are stored with a timestamp indicating the time that the cell was last updated and wherein a calculated cell is evaluated as being one of valid and invalid by comparing the timestamp of the calculated cell with the timestamp of its source cells in the upper level and by determining the validity of its source cells that are located below the validation curve.

20. The method of claim 19, comprising automatically updating the cell validity indicator for cells allocated to the lowermost level when new data is loaded into the database.

21. The method of claim 19, wherein cells in an upper level of said at least two levels are permanently indicated as invalid.

22. The method of claim 19, wherein only cells that may be queried are stored in the multidimensional database and the cells are indicated as one of valid and invalid at data load time.

* * * * *